April 27, 1948.   A. S. ORAVETZ   2,440,287
ELECTRONIC POWER TUBE TESTER
Filed July 25, 1945   3 Sheets-Sheet 1

INVENTOR.
ALBERT S. ORAVETZ.
BY Ralph L Chappell
ATTORNEY

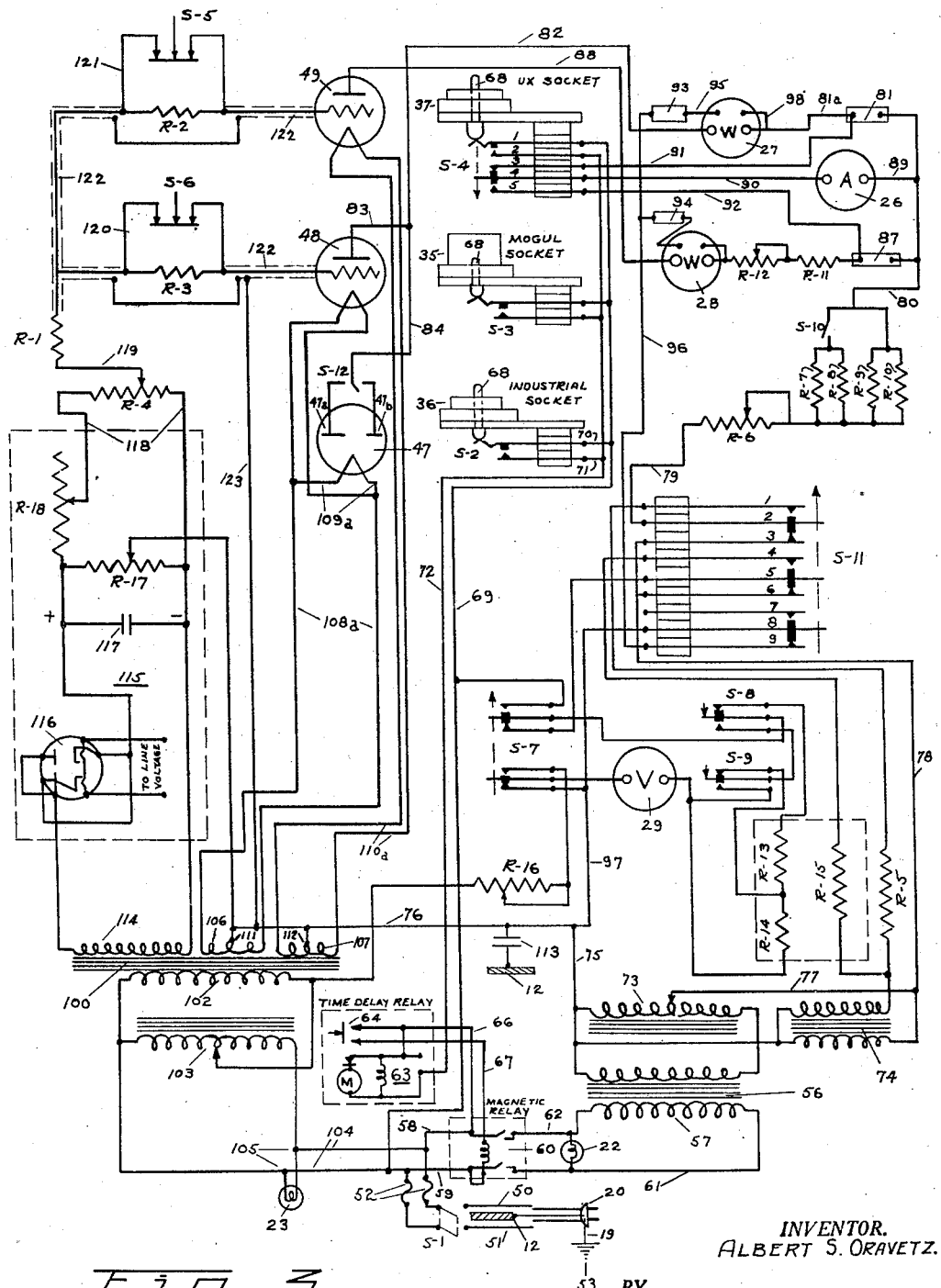

Patented Apr. 27, 1948

2,440,287

UNITED STATES PATENT OFFICE 2,440,287

ELECTRONIC POWER TUBE TESTER

Albert S. Oravetz, New York, N. Y.

Application July 25, 1945, Serial No. 607,074

6 Claims. (Cl. 315—369)

(Granted under the act of March 3, 1883, as amended April 30, 1928; 370 O. G. 757)

This invention relates to an electronic-tube tester for measuring the operating characteristics of rectifier tubes with particular application to determining the end of the useful life of the tubes. This tube tester is designed in such a manner as to provide a single portable test unit with which a plurality of tests may be made, and which may be easily transported from one station to another and operated by comparatively unskilled personnel. One instance in which a test unit of this type is of great value is upon repair ships for testing tubes used, for example, in navigational equipment.

An object of this invention is to provide a test unit for measuring the operating characteristics of rectifier tubes.

Another object is to provide a test unit for measuring the operating characteristics of gas-filled rectifier tubes.

A further object is to provide a method and apparatus for measuring average arc-drop for full-wave gas-filled rectifier tubes.

These characteristics are more fully defined as follows:

Starting voltage: The value of the positive anode potential relative to the cathode that is necessary to initiate the conduction current.

Average arc-drop voltage: The average potential between the anode and the cathode during the period in which the tube is passing current.

Critical grid current: The value of the grid current at the start of the conduction current.

Maximum forward voltage (R. M. S.): The highest value of the anode voltage relative to the cathode at which the grid retains control.

Still another object is to provide a single portable test unit of the type described which may be operated by relatively unskilled personnel.

Figure 1:
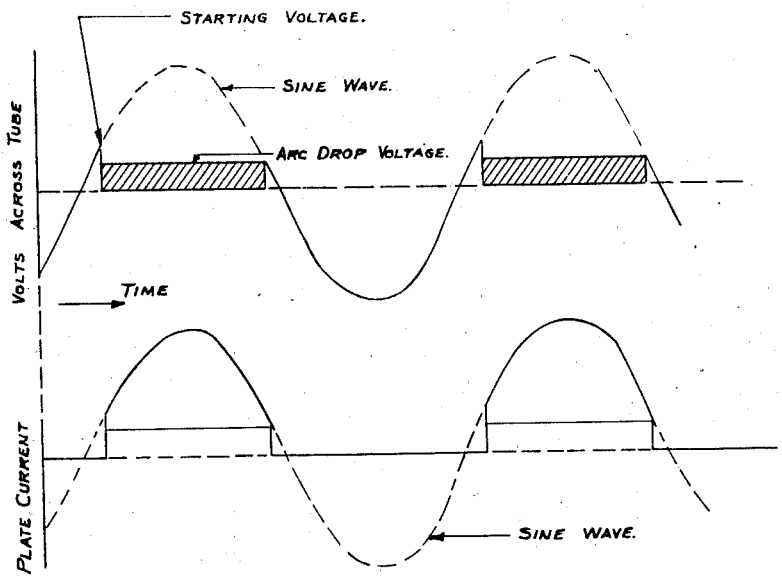
Figure 4:
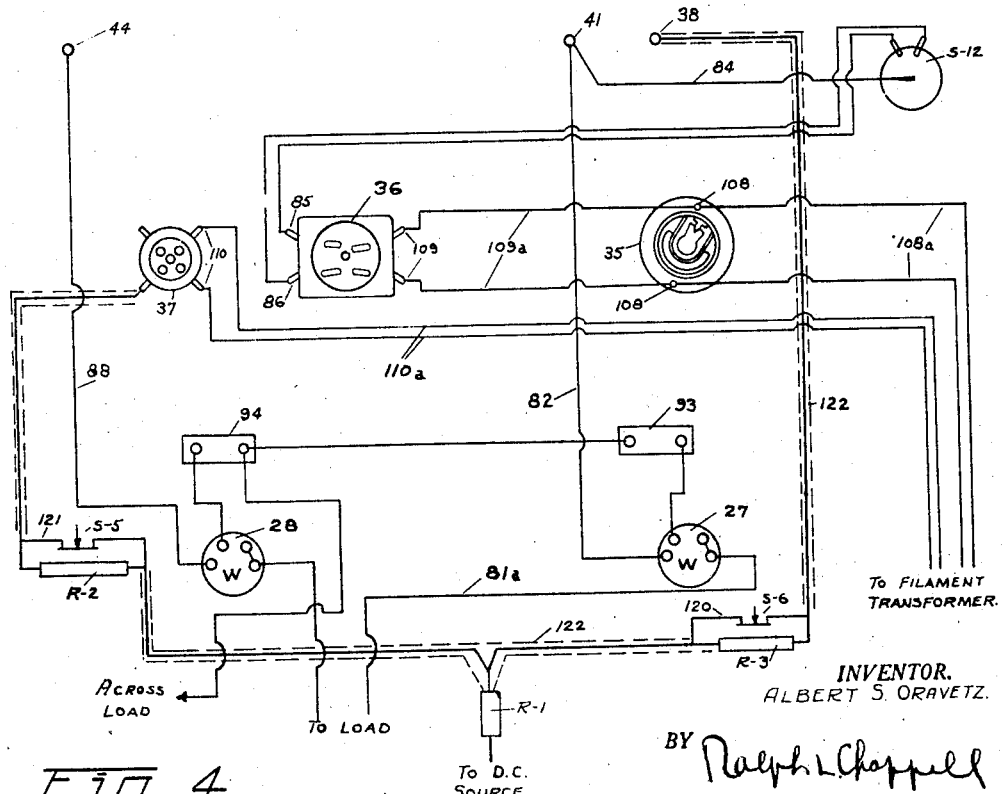
Figure 2:
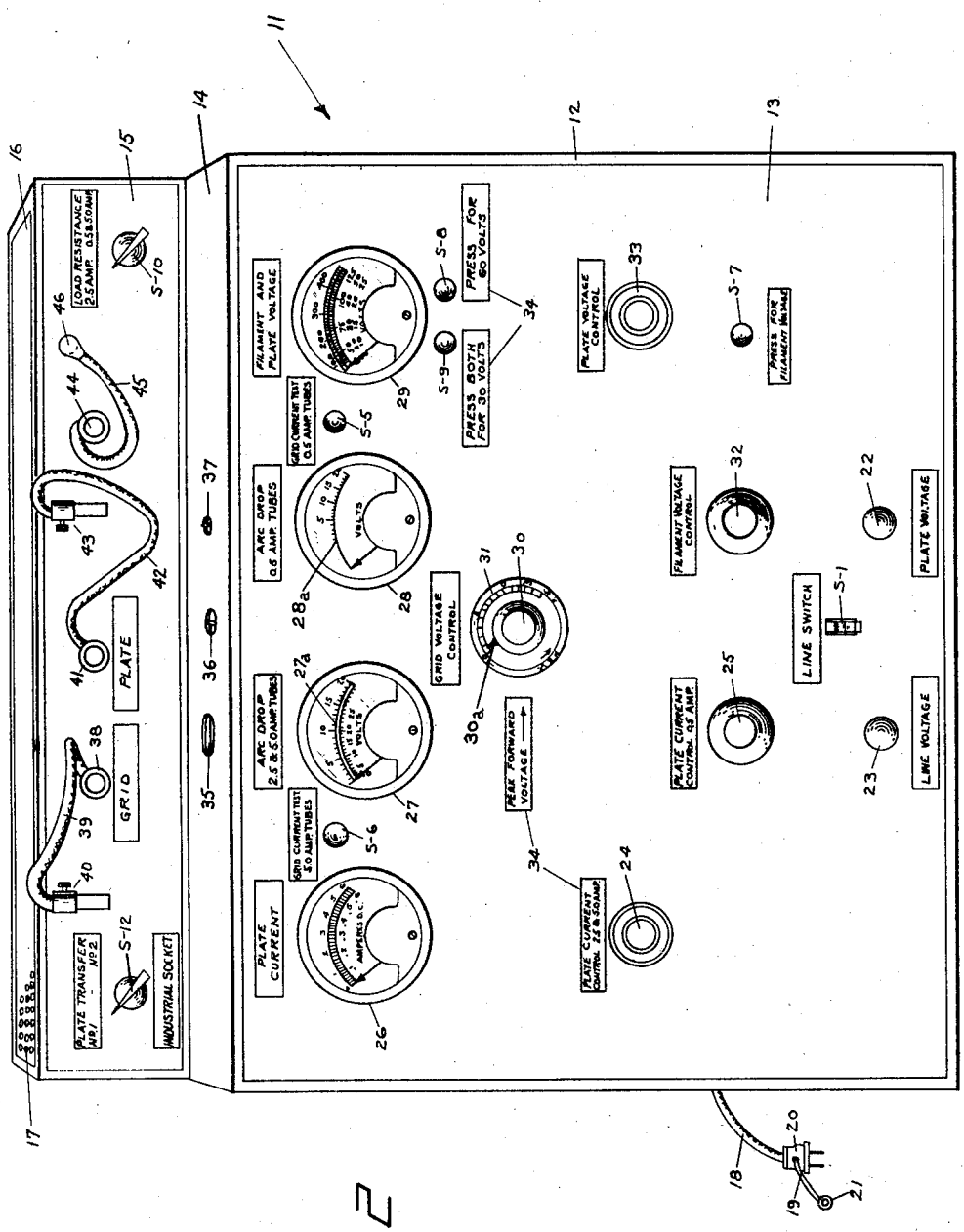

Further objects and advantages of this invention, as well as its construction, arrangement and operation, will be apparent from the following description and claims in connection with the accompanying drawings, in which, Fig. 1 is a graphical illustration of the wave shape of voltage and current in a grid-controlled power rectifier tube, Fig. 2 is a front perspective view, slightly distorted for the purpose of clarity, of the electronic tube tester of this invention, Fig. 3 is a diagrammatic illustration of the electrical circuits of the apparatus of Fig. 2, and Fig. 4 is a partial wiring diagram of the apparatus of Fig. 2.

The tube tester of this invention is designed to test tubes meeting both Navy and commercial specifications. Among the tubes that may be tested are commercial tubes EL-C1A, EL-C5A, EL-C6A, EL-5BHD, and EL-6CF and their Navy equivalents.

For the purpose of illustration only, in the following description and drawings of the tube tester embodying the principles of this invention, values assigned the equipment (transformers, rheostats, resistances, indicating instruments, etc.) are those suitable for use in testing rectifier tubes of 0.5, 2.5 and 5.0 ampere ratings. These values may optionally be changed by one skilled in the art for testing tubes of other types and ratings without departing from the principles of this invention as disclosed herein.

Figure 2 shows a box-like structure or receptacle, generally designated as 11, having a metal frame 12, a front or control panel 13, a tube bank 14, a top control panel 15, and a top panel 16. The top panel 16, side and back panels (not shown) are removably attached to the frame 12 and are preferably perforated as at 17 to promote cooling of the interior by convection currents.

Power is supplied the tester through insulated cable 18 entering the rear of the tester 11 and passing to toggle action on-off switch S—1 in the front control panel 13. The supply cable 18 is provided with a third conductor 19 which is connected to the inside of the metal frame 12 and extends through the plug 20 of the supply cable 18. The third conductor 19 is provided with a lug 21 for connection to a ground.

The front control panel 13 is further provided with a green pilot light 22 for indicating completion of the plate circuit; a red pilot light 23 for indicating completion of the filament circuit; a "Plate current control" knob 24 for controlling plate current in one ampere range which may be from 2.5 to 5.0 amperes; a "Plate current control" knob 25 for controlling plate current in another ampere range which may be in the order of 0.5 ampere; a D. C. ammeter 26 for indicating rectified current; an "Arc drop meter" 27 for indicating arc drop volts when using a plate current in the higher or 2.5 and 5.0 ampere range; an "Arc drop meter" 28 for indicating arc drop volts when using a plate current in the lower or 0.5 ampere range; a volt meter 29 for indicating filament and plate voltage; a push-button switch S—6 for providing additional grid resistance when testing tubes in the higher or 5.0 ampere range; a push-button switch S—5 for providing additional grid resistance when testing tubes in the lower or 0.5 ampere range; a "Grid voltage control" knob 30 provided with a dial 31; a "Filament voltage control" knob 32; a "Plate voltage control" knob 33; a push-button switch S—3 for providing one voltage range on voltmeter 29; a push-button switch S—9 for providing another voltage range on voltmeter 29; and a push-button switch S—7 for selectively placing the voltmeter 29 across the plate or filament circuits. All controls are provided with appropriate name plates 34.

The tube bank 14 is provided with a Mogul socket 35, and a four-prong industrial socket 36 for receiving tubes of for example 2.5 and 5.0 ampere ratings, and a UX socket 37 for receiving tubes of for example 0.5 ampere rating. The bases of these sockets are provided with switch operating means to be described below.

Upon the top control panel 15 is a "Plate transfer switch" S—12 for transferring from one plate to the other in testing full wave rectifier tubes; a grid terminal 38 and lead 39 having a clip 40 for connecting the grid terminal of a tube in the Mogul socket 35 or industrial socket 36 to the grid circuit of the tube tester; a plate terminal 41 and lead 42 having a clip 43 for connecting the plate terminal of a tube in the Mogul socket 35 or industrial socket 36 to the plate circuit of the tube tester; a plate terminal 44 and lead 45 having a clip 46 for connecting the plate terminal of a tube in the UX socket 37 to the plate circuit of the tube tester; and a selector switch S—10 for providing proper load resistance in the plate circuit.

In Fig. 3, for the purpose of illustration only, a full-wave rectifier tube 47 having two plates 47a and 47b is shown opposite the industrial socket 36, a grid-controlled rectifier tube 48 is shown opposite the Mogul socket 35, and another grid-controlled rectifier tube 49 is shown opposite the UX socket 37, with all circuits complete to each tube. Actually only one tube would be placed in the tester at a time. Thus one of the tubes shown would be placed in one of the three sockets depending upon its type of base and its ampere rating. The UX socket is provided with a grid connection as shown in Fig. 4 and is therefore used for tubes having grid terminals at their base. Optionally, any number of sockets with circuits complete to each may be provided depending upon the number of tubes of different types to be tested.

Power is supplied to the tester from an alternating-current supply which may be 115 v., 60 cycle, through the plug 20, conductors 50 and 51, switch S—1 and fuses 52. The frame 12 is grounded as at 53.

The plate voltage is supplied by a plate transformer 56, the primary 57 of which is connected to the power source through conductors 58 and 59, magnetic relay 60, and conductors 61 and 62. The green pilot lamp 22 is connected across the conductors 61 and 62 and lights when the magnetic relay 60 energizes the plate transformer 56.

Magnetic relay 60 is energized by time delay mechanism 63. This device 63 provides a time delay after the insertion of a tube into a socket to allow the filament to come to normal operating temperature before the plate voltage is applied. This delay unit 63 may consist of switch assembly 64 and a small synchronous motor M which, by a differential-gear system or other suitable means drives an adjustable contact arm (not shown). The adjustable timing contact is set for example, to provide a three-minute interval. At the end of this period the contact arm closes switch 64 which causes the magnetic relay 60 to be energized through conductors 66 and 67. As this relay operates, the synchronous motor M is disconnected and the line voltage is applied to plate transformer 56. A magnetically operated brake or other electrically responsive means (not shown) holds the contact arm and switch 64 in the closed position so that when the circuit to the time delay relay 63 is broken the contact arm and switch 64 return to their original positions causing the plate circuit to open. This condition occurs when the tube under test is removed from its socket, or when the power supply is interrupted.

The base of each socket 35, 36 and 37 is provided with a pin 68, which operates when a tube is properly placed in the socket to close a switch below the socket thereby completing the circuit to the time delay mechanism 63. At the bottom of the UX socket 37 is a double-pole double-throw leaf switch S—4. The upper pole of this switch S—4 is in the line circuit which actuates the time delay relay 63. It is normally open and closes only when a tube is seated in the UX socket 37. The lower pole of the switch S—4 is in the circuit to ammeter 26 (explained below). At the bottom of the mogul socket 35 is a single-pole single-throw leaf switch S—3, and at the bottom of the industrial socket is a single-pole single-throw leaf switch S—2, both of which operate in the same manner as the switch S—4 to energize the time relay 63. When, for example, a tube is placed in the industrial socket 36, the pin 68 is depressed closing the switch S—2 and completing the circuit from the supply source through conductors 69, 70 switch S—2, conductors 71 and 72 to the synchronous motor M. After three minutes the circuit to the plate transformer 56 closes.

The plate voltage is controlled by an adjustable auto-transformer 73 connected across the secondary coil of the transformer 56 by means of which the plate voltage may be varied from zero to line voltage, which for example may be 115 v. An additional transformer 74 is also provided for stepping up the plate voltage to for example 450 volts. This transformer 74 is selectively introduced into the plate circuit by means of switch S—11 and is so connected that the voltage supplied may be varied from 0-450 also by means of auto-transformer 73.

The Switch S—11, indicated upon the control panel 13 as "Peak forward voltage," comprises a double-throw triple-pole leaf switch. Normally the following contacts are closed: contacts 2 and 3 providing plate voltage in the 0-110 volt range; contacts 5 and 6 connecting the voltmeter 29 and resistances or voltage multipliers R—13 and R—14 across the plate circuit; and contacts 8 and 9 connecting the potential coils of "arc-drop meters" 27 and 28 across the plate circuit. When the grid-control knob 30 is turned to the extreme left so that the point 30a points to the "Peak forward voltage" position the switch S—11 operates as follows: contacts 2 and 3 are opened and contacts 1 and 2 are closed thereby shifting the plate voltage from the 0-110 volt to the 0-450 volt range and increasing the load resistance by introducing resistance R—5 into the plate circuit; contacts 5 and 6 are opened and contacts 4 and 5 are closed thereby introducing voltage multiplier R—15 into series circuit with the voltmeter 29; and contacts 8 and 9 are opened and contacts 7 and 8 are closed thereby opening the circuit to the potential coils of the arc-drop meters 27 and 28 so as to prevent damage to these meters due to high voltages. The switch S—11 is held in its normal position by spring tension or other yieldable retaining means. During the peak-forward voltage test the grid-control knob 30 is held at the peak-forward voltage position and returns to normal position automatically when released.

One portion of the plate circuit may be traced from the auto-transformer 73 through conductors 75 and 76 to center taps in the filament transformer windings (described below).

With the switch S—11 in normal position so that voltage in the 0-110 volt range is supplied, the remaining portion of the plate circuit may be traced from auto transformer 73 through conductor 77, conductor 78, contacts 2 and 3 of switch S—11, conductor 79, variable resistor R—6, through fixed parallel resistors R—9 and R—10 selectively by means of switch S—10 through fixed resistors R—7 and R—8 in parallel with resistors R—9 and R—10, through conductor 80, and when a tube is in either the industrial socket 36 or mogul socket 35, through an instrument shunt 81, which may be of 6.0 ampere rating, conductor 81a, the current coil of arc drop meter 27, and conductor 82 to the plate terminal 41 located on the top control panel 13 (see Fig. 4). Fig. 3 shows the circuit complete from conductor 82 to the plate of tube 48 through conductor 83. Actually this conductor corresponds to the plate terminal lead 42 shown on the top control panel 13 (Fig. 2).

Fig. 3 also shows the circuit complete from conductor 82 to one of the plates of the full-wave rectifier tube 47 opposite the industrial socket 36, through conductor 84 and switch S—12. As shown in Fig. 4, the industrial socket 36 is provided with plate connections 85 to one plate of the tube under test and 86 to the other plate of the said tube. These connections lead to the switch S—12, also located on the top control panel 13 (Fig. 2), by means of which either plate of the tube under test may be selectively placed in the plate circuit. Conductor 84 (Figs. 3 and 4) connects the switch S—12 to the plate terminal 41.

When a tube is in the UX socket 37, the plate circuit may be traced beginning at conductor 80 through an instrument shunt 87 of lower ampere rating, for example 0.6 ampere, a fixed resistor R—11, a variable resistance R—12, the current coil of arc drop meter 28, and conductor 88 to the plate terminal 44 above UX socket 37 (Fig. 4). Fig. 3 shows the conductor 88 going directly to the plate of the tube 49 opposite the UX socket. Actually this connection is made from plate terminal 44 through lead 45 on the top panel of the tester (see Fig. 2).

The plate ammeter 26 has two current ranges, for example 0-6 and 0-0.6 amperes. The proper range is automatically selected by the insertion of a tube into its proper socket. This ammeter 26 is connected through switch S—4 located at the bottom of the UX socket 44 to either shunt 81 or shunt 87. With no tube in the UX socket 37, the switch S—4 connects the ammeter 28 across the terminals of the shunt 81 through conductors 89, 90 contacts 3 and 4 of the switch S—4 and conductors 91. With a tube in the UX socket the ammeter 26 is connected across the shunt 87 through conductors 89, 90, contacts 4 and 5 of the switch S—4 and conductor 92.

The meters 27 and 28, which are actually wattmeters calibrated to indicate arc drop volts directly, as will be described below, are so connected that the current coil of the arc drop meter 28 is in the plate circuit leading to the plate terminal 44 above the UX socket 37, and the current coil of the arc drop meter 27 is in the plate circuit leading to the plate terminal 41 at the mogul and industrial sockets (see Fig. 4). External voltage multipliers 93 and 94 are used with the potential coils of these meters. One terminal of the potential coil of meter 27 is connected through conductor 95, multiplier 93, conductor 96, contacts 8 and 9 of switch S—11, conductor 97, and conductor 76 to the center-taps of the filament transformer windings. The other terminal of the potential coil of meter 27 is connected to the current coil terminal by conductor 98. The potential coil of meter 28 is connected through multiplier 94 in the same manner. The circuit from the potential coils of both arc drop meters passes through switch S—11 which automatically disconnects these coils from the plate circuit during the peak forward test as previously described.

The rectified plate power, exclusive of that lost in the tube under test, is dissipated in the series load resistances. In testing 5.0 ampere tubes, the load resistors R—7, R—8, R—9 and R—10 may be fixed 25 ohm resistors and are connected in parallel with each other and in series with variable resistor R—6 which may be a 7.8 ohm rheostat. In testing 2.5 ampere tubes the resistors R—7 and R—8 are disconnected from the load circuit by means of "Load resistance" switch S—10. In testing 0.5 ampere tubes the fixed resistance R—11 and variable R—12 are added to the plate circuit. These resistors may have a value of 50 ohms each.

The filament heating current is provided by a filament-grid transformer 100. The input voltage to the primary coil 102 of the transformer 100 is controlled by an auto transformer 103 which is connected across the line voltage as at 104 and is adjusted to supply the proper voltage which may be for example 117 v. The red indicator light 23 is connected across the circuit as at 105.

The input voltage is indicated by the "Filament and plate" voltmeter 29 which by means of switch S—7 may be connected in either the plate or filament circuit.

The filament grid transformer 100 has two secondary filament windings 106 and 107 which for example may be of 2.5 volt rating each. Filament winding 106, which for example may have a current capacity of 26 amperes, is connected to the filament terminals 108 of the mogul socket 35 through conductors 108a and to the filament terminals 109 of the industrial socket 36 through conductors 109a (see Fig. 4). The filament winding 107, which for example may have a current capacity of 7 amperes is connected to the filament terminals 110 of the UX socket 37 through conductors 110a (see Fig. 4). Fig. 3 shows conductors 108a, 109a and 110a connected directly to the filaments of the tubes under test. The filament windings 106 and 107 are center tapped as at 111 and 112 to provide a return for the grid and plate circuits. A condenser 113 is connected from the center taps to the frame 12 of the tester in order to stabilize the grid. As a safety precaution to prevent possible electrical shock hazard if some circuit should be shorted to the frame of the tester, the frame 12 is grounded through the conductor 19 in the supply cable (as described above).

The grid voltage is obtained from a secondary winding 114, which for example may be of 21 volt rating, on the filament grid transformer 100, and is rectified by a rectifier unit 115 to supply D. C. voltage. This rectifier unit 115 consists of a vacuum tube rectifier 116, a filtering condenser 117, an adjustable resistor R—18, and an adjustable resistor R—17. The adjustable resistors R—18 and R—17 are so adjusted that when the input to the filament grid transformer 100 is maintained at rated value, potentials of from −15 volts to +6 volts relative to the center tap of the filament windings are available. To permit the application to the grid of any voltage within this range, a potentiometer rheostat R—4 is connected across the rectifier terminals as at 118. The moving contact 119 of the potentiometer rheostat R—4 is connected through the grid resistors R—1 and R—3 to the grid terminal 38 on the top control panel 13 (see Fig. 4) and through resistors R—1 and R—2 to the UX socket 37. Fig. 3 for the purpose of illustration only, shows a direct connection from R—3 to the grid of tube 48 opposite the Mogul socket 35 and from R₂ to the grid of tube 49 opposite the UX socket 37.

The grid potential is determined from graduated dial 31 on the front panel adjacent to the grid control knob 30 (Fig. 2). This dial 30a is graduated from +5 to —10 volts in 1-volt steps and at —15 volts with a designation marked "Peak forward voltage." The normal grid resistance R—1 consists of a 10,000 ohm resistor which is in series with a 1 megohm resistor R—2 or R—3 depending upon which test socket is used. Resistor R—3 (as aforestated) is in the grid circuit to the grid terminal above the Mogul and Industrial test sockets. Resistor R—2 is in the grid circuit to the UX socket (see Fig. 4). These grid resistors R—3 and R—2 are normally shunted as at 120 and 121, respectively. The shunt 120 across R—3 is removed for the grid current test by depressing push button switch S—6. Likewise the shunt 121 across R—2 is removed by depressing push button switch S—5. The grid conductors are shielded as at 122. This shielding is grounded to the frame 12 of the tester through conductor 123 and condenser 113.

For testing 0.5, 2.5 and 5.0 ampere tubes the voltmeter 29 has four voltage ranges 0–30, 0–60, 0–150 and 0–450 which may be selected by inserting proper resistances R—13, R—14, R—15. Resistors R—13 and R—14 are normally in the plate circuit giving a voltage range of from 0–150. The 0–30 voltage range may be secured by depressing push button switches S—8 and S—9 shunting both resistances R—13 and R—14. The 0–60 volt range is secured by depressing S—8 shunting resistance R—13 but leaving R—14 in the circuit. The 0–450 volt range is selected automatically by switch S—11 when the grid voltage control knob 30 is turned to peak forward voltage.

When the grid control knob 30 is turned to the "Peak forward voltage" position the arc drop meter potentials are disconnected and the additional transformer 74 is connected in the plate circuit. This transformer 74 has a high secondary voltage rated for example at 450 volts and has an added load resistance R—5 of for example 4500 ohms. The resistance R—15 is placed in the voltmeter circuit by means of contacts 4 and 5 of the switch S—11 in addition to the resistances R—14 and R—13 normally in the circuit thus giving the voltmeter a 0–450 volt range.

As afore-mentioned, the meters 27 and 28 are calibrated to read arc drop volts directly. The average arc drop is the average ordinate of that portion of the voltage cycle indicated by the shaded section on Fig. 1. An accurate indication of this value, and one which is unaffected by starting voltage and temperature, can be obtained by the use of a wattmeter and a D. C. ammeter. The wattmeter is connected (as meters 27 and 28 shown in Fig. 3) so that the tube current passes through its current coil and the potential across the tube is applied across its potential coil. The D. C. ammeter is connected in such a manner that it will measure the average value of the rectified current (as ammeter 26, Fig. 3). By examining the current and voltage curves of Fig. 1 it is seen that arc drop occurs only when current is flowing through the tube. As a result the average value of the product of current and voltage measured by the wattmeter takes no account of the voltages during that part of the cycle when current is not flowing. If this product is divided by the average value of the current, the result will be the average value of the arc drop during that portion of the cycle when the tube is conducting. For any particular D. C. average current, the wattmeter dial can be graduated in equivalent arc-drop volts instead of watts. Thus the dial 27a of arc drop or wattmeter 27 is calibrated to indicate arc drop volts for a D. C. average current of for example 5.0 and 2.5 amperes and the dial 28a of arc drop or wattmeter 28 is calibrated to indicate arc-drop volts for a D. C. average current of for example 0.5 ampere.

In operation, in testing tubes of 0.5, 2.5 and 5.0 ampere rating, the supply cable 18 is connected to a 115 volt, 60 cycle A. C. source and the ground conductor 19 is connected to a suitable ground (metal pipe, metal conduit, or a steel or other conductive bulkhead). The load resistance switch S—10 (Fig. 2) is set to the position marked "0.5–5.0 amp" for C1A, C5A and C6A tubes. For 5BHD and 6CF tubes the switch S—10 is set to the position marked "2.5 amp." When testing full wave rectifier tubes, such as 6CF, the "Plate transfer" switch S—12 is set to "No. 1." Each plate of full wave rectifier tubes is tested separately. This switch S—12 is disregarded when testing grid controlled rectifier tubes.

The tube to be tested is now placed in the proper socket and grid and plate connections are made as required. When the UX socket 37 is used only the plate connection need be made as the grid is connected through the socket to the base grid outlet of the tube. When the Mogul socket 35 is used, both the plate and grid connections must be made. In testing, for example, 5BHD tubes, only the plate connector is used.

The plate voltage control knob 33 is now turned to the zero plate-voltage position. The line switch S—1 is closed and the red pilot light 23 comes on, indicating that power is available for heating the filament. The filament voltage is now adjusted by means of "Filament voltage control" knob 32 until the proper filament voltage is indicated on the voltmeter 29 when the "Press for filament voltage" switch S—7 is closed. The filament of the tube under test is now allowed to heat and should be red hot after about a minute. At the end of a predetermined heating period, as for example three minutes, the automatic time delay relay 63 will close, causing the green pilot lamp 22 to light and the plate-voltage transformer 56 to be connected to the power supply.

The plate voltage is now increased to 110 volts as indicated by voltmeter 29 by turning the "Plate voltage control" knob 33. At the same time the "Plate current control" knob 24 is adjusted to keep the plate current from exceeding the operating value of the tube. When testing, for example, EL-C5A tubes the knob 24 is adjusted so that a reading of 5.0 amperes is indicated upon the ammeter 26; when testing, for example, EL-5BHD and EL-6CF tubes the knob 24 is adjusted so that a reading of 2.5 amperes is indicated upon ammeter 26, and; when testing, for example, EL-C1A tubes the "Plate current control 0.5 amp." knob 26 is adjusted so that a reading of 0.5 ampere is indicated upon ammeter 26.

The tube is operated for approximately three minutes at the specified plate voltage and current to allow the tube to attain its operating temperature. To obtain consistent test results, all test reading should be taken as quickly as possible to prevent the tube from cooling.

Test of full-wave rectifiers

The arc-drop volt value is obtained by reading the arc-drop meter 27 directly. The proper scale on this meter must be read, however. The "arc-drop" for type 5BHD and 6CF tubes, for example, is read on the scale of the meter 27 for 2.5 ampere tubes.

The plate voltage is now reduced by turning "Plate voltage control" knob 33 until the tube just ceases to fire. The "A. C. starting voltage" is read at this point on the "Plate and filament voltmeter" 29 using the scale changing push button switches S—8 and S—9 to obtain the appropriate scale on the voltmeter.

The procedure is repeated for "Arc drop" and "A. C. starting voltage" with the second plate of the tube connected by means of switch S—12.

Test of grid-controlled rectifiers

The "Arc drop volts" value is read directly on the appropriate arc drop meter 27 or 28. For type C1A tubes the meter 28 for "Arc drop 0.5 ampere tubes" is used and for C5A and C6A tubes the meter 27 is used and the reading is taken off the scale for 5.0 ampere tubes.

The "Starting voltage" is obtained by operating the tube at a grid bias of +3 volts D. C. (obtained by turning the "Grid voltage control" knob 30 until the point 30a indicates this value on the dial 31) with a load current corresponding to the tube rating, as for example 5.0 amperes, and gradually reducing the plate voltage from 110 volts A. C. by turning "Plate voltage control" knob 33 until the tube ceases to fire. The A. C. starting voltage is read upon the voltmeter 29, again selecting the proper scale with push button switches S—8 and S—9.

The plate voltage is now returned by means of "Plate voltage control" knob 33 to its initial value of 110 volts. The load current remains that at which the tube is rated. The grid potential is now gradually changed to negative value by means of "Grid voltage control" knob 30 until the tube just ceases to fire. The "Critical grid voltage" is that value of the grid potential as indicated by the point 30a of the "Grid voltage control" knob upon the dial 31.

The "Grid control" knob 30 is now immediately turned back to its +3 volt position. The "Grid current" is determined by repeating the procedure for "Critical grid voltage" and determining the grid voltage with an additional one megohm resistor in the circuit (as aforementioned a 10,000 ohm resistance R—1 is normally in the grid circuit). This is accomplished by depressing "Grid current test" switch S—5 placing 1 megohm resistance R—2 in the grid circuit when testing tubes of 0.5 ampere rating, such as type C1A, or by depressing "Grid current test" switch S—6 placing 1 megohm resistance R—3 in the grid circuit when testing tubes of 5 ampere rating, such as type C5A or C6A, and carrying out the test procedure with the proper button depressed. The difference in the reading of the dial 31 with the one megohm resistance in the circuit (i. e., with the appropriate switch S—5 or S—6 depressed) and with the one megohm resistance out of the circuit is equal to "Grid current" in microamperes. Since the actual potential on the grid is the same when the tube ceases to fire in both cases this may be proven as follows:

Letting $E_G$ = Actual potential on grid at cut off
$I_0$ = Grid current, $R_1$ in circuit
$I$ = Grid current, R—1 and $R_2$ in circuit
$E_{g1}$ = Indicated grid potential with $R_1$ in circuit
$R_1$ = 10,000 ohms
$E_{g2}$ = Indicated grid potential with R—1 and $R_2$ in circuit
$R_2$ = 1 megohm Then $$E_G - E_{g1} = R_1 I_0$$
$$E_G - E_{g2} = R_2 I$$

Since $R_1$ is approximately one percent of $R_2$, it can be assumed that $R_1$ is zero, hence:

$$E_G = E_{g1}$$

and since $R_2 = 10^6$ ohms $$\frac{E_{g1} - E_{g2}}{10^6} = I \text{ amperes}$$

$$E_{g1} - E_{g2} = I \text{ microamperes}$$

Hence, the grid current in microamperes is equal to the difference in grid indications.

The final test is the maximum or R. M. S. forward voltage. The plate voltage is reduced to a low value by turning "Plate voltage control" knob 33. The "Grid voltage control" knob 30 is turned to the "Peak forward test" position and held in place. This provides a negative grid bias of −15 volts and operates switch S—11 to provide plate voltage in the 0–450 volt range. The plate voltage is now increased until the tube fires between the cathode and plate. The R. M. S. forward voltage is read on the 450 volt scale of the voltmeter 29.

In shutting down the tester the "Plate voltage control" knob is returned to the zero position, the line switch S—1 is turned off, the plate and grid clips are removed, and the tube under test is removed from its socket.

A summary of tube test conditions using the electronic tube tester of this invention for tube types C1A, C5A, 5BHD, and 6CF is as follows:

| Tube Type | C1A | C5A and C6A | 5BHD and 6CF |
|---|---|---|---|
| Filament Voltage | 2.5 | 2.5 | 2.5 |
| Filament Heating time, minutes | 3 | 3 | 3 |
| Grid resistance, ohms | 10,000 | 10,000 | |
| Pre-test operation time, minutes | 3 | 3 | 3 |
| Pre-test Operation Conditions: | | | |
|   Plate Voltage | 110 | 110 | 110 |
|   Plate Current (Amp. D. C.) | 0.5 | 5.0 | 2.5 |
|   Grid Voltage | +3 | +3 | |
| Arc Drop Test: | | | |
|   Plate Voltage | 110 | 110 | 110 |
|   Plate Current | 0.5 | 5.0 | 2.5 |
|   Grid Voltage | +3 | +3 | |
| Starting Voltage Test: | | | |
|   Plate Current (start) | 0.5 | 5.0 | 2.5 |
|   Grid Voltage | +3 | +3 | |
| Grid Current Test: | | | |
|   Plate Voltage | 110 | 110 | |
|   Plate Current | 0.5 | 5 | |
|   Grid Resistance— | | | |
|     (a) ohms | 10,000 | 10,000 | |
|     (b) megohms | 1 | 1 | |
| Critical Grid Voltage Test: | | | |
|   Plate Voltage | 110 | 110 | |
|   Plate Current (start) | 0.5 | 5.0 | |
| Forward Voltage Test (R. M. S.): | | | |
|   Grid Voltage | −15 | −15 | |

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A voltmeter for measuring the voltage drop across an electron-discharge tube during periods of conduction, said voltmeter comprising a wattmeter connected across the plate and cathode circuit of said tube, and an ammeter serially connected in the plate circuit of said tube, said ammeter connection being such as to make said wattmeter responsive to and indicative of average arc-drop voltage in the tube tested.

2. In an electronic-tube tester having means for testing electron discharge tubes of diverse types, each said tube having respective plate-cathode circuits, the combination comprising a multiple-range arc-drop indicating device; means conjointly connecting said plurality of plate-cathode circuits to said multiple range arc-drop indicating device, and means for automatically selecting one of the ranges of said multiple range indicating device corresponding to a predetermined operating characteristic of one of said electron discharge tubes.

3. In an electronic-tube tester having a plate circuit and a cathode circuit, each adapted to be connected to a power source, and having a plurality of sockets for receiving tubes to be tested, the improvement comprising ammeter means connected to measure the plate current passed by a tube during test, a plurality of power measuring devices connected in the plate and cathode circuits to measure the power expended in said tube, and means associated with at least one of said sockets for automatically selecting one of said power-measuring devices upon the insertion of a tube in said one socket, whereby a predetermined one of said power-measuring devices may be selected for use with the particular tube inserted.

4. In a tester for electron-discharge tube having a plate cathode circuit connected to a source of power for establishing an electric discharge through said tube, the combination of wattmeter means having a current coil, a potential coil and dial face, the current coil of said wattmeter means being connected in series in the plate circuit to receive a rectified current, the potential coil of said wattmeter means being connected across the plate circuit so as to receive plate-to-cathode potential, and the dial face of said wattmeter means being calibrated to indicate directly arc drop volts for a series of applied values of average current.

5. Electrical test apparatus for an electron-discharge tube having a cathode and an anode adapted to be interconnected to define a plate circuit, said apparatus comprising a first electrical-quantity measuring device including a current-responsive member in series with said plate circuit and a voltage-responsive member in shunt with said plate circuit, said current- and voltage-responsive members being relatively movable normally to provide an indication of the power expended during intervals of conduction of current in said plate circuit, a second electrical-quantity measuring device having a current-responsive member in series with said plate circuit for indicating the current flow in said plate circuit, means for adjusting the magnitude of current in said plate circuit to a predetermined value, and indicia cooperable with said first electric measuring device for indicating the quotient of the magnitude of said expended power and the predetermined current value in said plate circuit.

6. A method of testing an electric discharge tube for arc-drop voltage, said method comprising subjecting said tube to conditions such that a pulsating unidirectional current passes through said tube, applying a varying voltage to said tube while said current passes, and deriving an indication corresponding to the quotient of the average power expended in said tube and the current passing therethrough.

ALBERT S. ORAVETZ.

REFERENCES CITED

The following references are of record in the file of this patent:

UNITED STATES PATENTS

| Number | Name | Date |
|---|---|---|
| 1,893,223 | Burkle | Jan. 3, 1933 |
| 1,920,906 | Goodwin | Aug. 1, 1933 |
| 1,949,634 | Simpson | Mar. 6, 1934 |
| 1,954,305 | Williams | Apr. 10, 1934 |
| 2,092,896 | Stinchfield | Sept. 14, 1937 |
| 2,104,844 | Affel | Jan. 11, 1938 |
| 2,264,066 | Buchard | Nov. 25, 1941 |